(12) United States Patent
Ramrattan et al.

(10) Patent No.: US 8,982,063 B2
(45) Date of Patent: *Mar. 17, 2015

(54) OPTICAL NAVIAGATION MODULE HAVING A METALLIC ILLUMINATION RING

(75) Inventors: Colin Shiva Ramrattan, Waterloo (CA); Robert James Lowles, Waterloo (CA)

(73) Assignee: BlackBerry Limited, Waterloo (CA)

( * ) Notice: Subject to any disclaimer, the term of this patent is extended or adjusted under 35 U.S.C. 154(b) by 347 days.

This patent is subject to a terminal disclaimer.

(21) Appl. No.: 13/215,814

(22) Filed: Aug. 23, 2011
(Under 37 CFR 1.47)

(65) Prior Publication Data
US 2012/0133583 A1    May 31, 2012

Related U.S. Application Data

(63) Continuation-in-part of application No. 12/712,612, filed on Feb. 25, 2010.

(51) Int. Cl.
| | | |
|---|---|---|
| G06F 3/033 | (2013.01) | |
| G09G 5/08 | (2006.01) | |
| G06F 3/041 | (2006.01) | |
| G06F 3/045 | (2006.01) | |
| G06F 3/042 | (2006.01) | |
| G06F 1/16 | (2006.01) | |
| G06F 3/0354 | (2013.01) | |
| G06F 3/044 | (2006.01) | |

(52) U.S. Cl.
CPC .............. *G06F 1/169* (2013.01); *G06F 3/03547* (2013.01); *G06F 3/042* (2013.01); *G06F 3/044* (2013.01); *G06F 2203/04106* (2013.01); *G06F 2203/04108* (2013.01)

USPC ............ 345/173; 345/157; 345/174; 345/175

(58) Field of Classification Search
USPC .................................................. 345/156–184
See application file for complete search history.

(56) References Cited

U.S. PATENT DOCUMENTS

| | | |
|---|---|---|
| 5,039,832 A | 8/1991 | Polacek et al. |
| 5,239,295 A | 8/1993 | DeLuca |
| 5,288,957 A | 2/1994 | Swaybill |
| 5,780,965 A | 7/1998 | Cass et al. |

(Continued)

FOREIGN PATENT DOCUMENTS

| | | |
|---|---|---|
| WO | 9926128 | 5/1999 |
| WO | 03102717 A2 | 12/2003 |

OTHER PUBLICATIONS

Extended European Search report mailed Jan. 20, 2012. In corresponding application No. 11178537.4.

(Continued)

*Primary Examiner* — Ryan A Lubit
(74) *Attorney, Agent, or Firm* — Novak Druce Connolly Bove + Quigg LLP

(57) ABSTRACT

A navigation module for a handheld communication device having a navigation pad, a chrome-like ring surrounding the navigation pad, an illumination ring surrounding the navigation pad, and at least one light source optically coupled to the at least the illumination ring. The illumination ring can be interposed between the chrome-like ring and the navigation pad. The chrome-like ring can be interposed between the illumination ring and the navigation pad. The light source can be a light emitting diode.

18 Claims, 7 Drawing Sheets

(56) References Cited

U.S. PATENT DOCUMENTS

| | | | |
|---|---|---|---|
| 6,411,029 | B1 | 6/2002 | Czak |
| 6,465,951 | B1 | 10/2002 | Krafcik et al. |
| 6,565,223 | B2 | 5/2003 | Liao et al. |
| 6,773,644 | B1 | 8/2004 | Eiden |
| 6,790,396 | B2 | 9/2004 | Eiden et al. |
| D514,570 | S | 2/2006 | Ohta |
| 7,423,227 | B2 | 9/2008 | Xie et al. |
| 7,572,023 | B2 * | 8/2009 | Chen ............................ 345/176 |
| 8,085,141 | B2 * | 12/2011 | Hill et al. ...................... 345/173 |
| 2001/0038381 | A1 | 11/2001 | Griencewic |
| 2002/0163524 | A1 * | 11/2002 | Dutta ............................. 345/589 |
| 2004/0027341 | A1 | 2/2004 | Derocher |
| 2006/0011461 | A1 | 1/2006 | Chan et al. |
| 2006/0181521 | A1 | 8/2006 | Perreault et al. |
| 2007/0152977 | A1 * | 7/2007 | Ng et al. ....................... 345/173 |
| 2007/0286966 | A1 | 12/2007 | Chen et al. |
| 2007/0296701 | A1 | 12/2007 | Pope et al. |
| 2008/0291169 | A1 | 11/2008 | Brenner et al. |
| 2009/0167723 | A1 * | 7/2009 | Kwong et al. ................ 345/175 |
| 2009/0244026 | A1 | 10/2009 | Purdy et al. |
| 2010/0123675 | A1 * | 5/2010 | Ippel ............................. 345/173 |
| 2010/0177060 | A1 | 7/2010 | Han |
| 2010/0302155 | A1 * | 12/2010 | Sands et al. ................... 345/173 |
| 2011/0008556 | A1 * | 1/2011 | Shi et al. ...................... 428/35.9 |
| 2011/0175748 | A1 * | 7/2011 | Small et al. ................... 345/173 |

OTHER PUBLICATIONS

Anonymous: NCVM of Mobile phone cover parts, Internet citation, Nov. 27, 2009, p. 1 XP002584823, Retrieved from the Internet: URL:http://www.manufacture.com/product/i8620373-NCVM+ofOmobile+phone+cover+parts.html (retrieved on May 28, 2010).

Moritex, Light Guides, http://www.moritexusa.com/products/products.php?plid=24&pid=63,pp. 64-65; Mar. 2007.

Extended European Search Report mailed Jul. 8, 2010. In corresponding application No. 10154741.2.

Examination Report mailed Jul. 31, 2012, in corresponding European patent application No. 10154741.2.

Anonymous: BlackBerry 8900 Series Discussion—No light for the trackball?, Jan. 8, 2009, pp. 1-12, XP55033389, retrieved from the internet: URL:http://www.blackberryforums.com/general-8900-series-discussion-javelin/169426-no-light-trackball.html; retrieved on Jul. 19, 2012.

Examination Report mailed Sep. 3, 2012, in corresponding European patent application No. 11178537.4.

Examination Report mailed Apr. 11, 2013, in corresponding European patent application No. 11178537.4.

Becky V.; "Inside the Trackpad: a BlackBerry Science Lesson", Inside Blackberry, Dec. 18, 2009, XP055057914, retrieved from the internet: URL:http://blogs.blackberry.com/2009/12/inside-the-trackpad-ablackberry-science-lesson; retrieved on Mar. 26, 2013.

Examination report mailed Aug. 3, 2012, in corresponding European patent application No. 11178537.4.

Office Action mailed Dec. 12, 2013; in corresponding Canadian patent application No. 2,787,595.

Summons to attend oral proceedings pursuant to Rule 115(1) EPC mailed Jan. 7, 2014; in corresponding European patent application No. 11178537.4.

Decision to refuse a European Patent application mailed May 21, 2014; in corresponding European patent application No. 11178537.4.

Provision of the minutes in accordance with Rule 124(4) EPC mailed May 16, 2014; in corresponding European patent application No. 11178537.4.

Subsequent Office Action mailed May 16, 2014; in corresponding Canadian patent application No. 2,732,946.

Office Action mailed Feb. 20, 2014; in corresponding U.S. Appl. No. 12/712,612.

Final Office Action mailed Jan. 29, 2014; in corresponding U.S. Appl. No. 12/831,036.

Examination Report mailed May 13, 2013; in corresponding European patent application No. 10168567.5.

Anonymous; diNov Mini; Palm-sized keyboard with media remote and clickpad; logitech Reviewers' Guide; Jan. 1, 2007, pp. 1-13, XP55061745; http:www.visuellteknik.se/bilder/artiklar/pdf/145034.pdf. and retrieved on May 3, 2013.

Office Action mailed Jan. 15, 2013; in corresponding Canadian patent application No. 2,732,964.

Examination Report mailed Jul. 31, 2012; in corresponding European patent application No. 10168567.5.

Buscemi, Karen; "Decorative Trim/Nameplates: Bending Light", Sep. 1, 2004, pp. 1-2, XP002597270' Retrieved from the internet: URL: http://www.appliancedesign.com /Articles/Feature_Article/048cd7f638a38010VgnVCMi00000f932a8cO; retrieved on Aug. 19, 2010.

Extended European Search Report mailed Sep. 1, 2010; in corresponding European patent application No. 10168567.5.

Extended European Search report mailed Jan. 19, 2012; in corresponding European patent application No. 11178537.4.

Office Action mailed May 13, 2013; in corresponding Canadian patent application No. 2,732,946.

Brief Communication mailed Oct. 29, 2013; in corresponding European patent application No. 10154741.2.

Anonymous: "8900 Keyboard Backlight", Feb. 14, 2009, pp. 1-4 XP55084774, retrieved from the internet: URL: http://forums.crackberry.com/blackberry-curve-8900-f100/8900-keyboard-backlight-159792/retrieved on Oct. 22, 2013.

donovanx3: "Blackberry Curve 8900 backlight brightness", Aug. 9, 2009 p. 1, XP054975223, retrieved from the internet : URL: http://www.youtube.com/watch?v=R8hc2f8qB6Q, retrieved on Oct. 24, 2013.

Provision of the minutes in accordance with Rule 124(4) EPC mailed Dec. 6, 2013, in corresponding European patent application No. 10154741.2.

Office Action mailed Dec. 9, 2013; in corresponding Canadian patent application No. 2,732,964.

Office Action mailed May 16, 2014; in corresponding Canadian patent application No. 2,732,946.

Final Office Action mailed Jul. 1, 2014; in corresponding U.S. Appl. No. 12/712,612.

Notice of Allowance and Fee(s) Due mailed Sep. 11, 2014; in corresponding U.S. Appl. No. 12/712,612.

Office Action mailed Dec. 9, 2014; in Canadian patent application No. 2,787,595.

\* cited by examiner

OPTICAL NAVIAGATION MODULE HAVING A METALLIC ILLUMINATION RING

CROSS REFERENCE TO RELATED APPLICATIONS

This application is a continuation-in-part of application Ser. No. 12/712,612, filed on Feb. 25, 2010.

FIELD OF TECHNOLOGY

The present disclosure relates generally to a navigation module and more specifically to an illuminated navigation module.

BACKGROUND

With the advent of more robust mobile electronic systems, advancements of handheld communication devices are becoming more prevalent. Handheld communication devices can provide a variety of functions including, for example, telephonic, electronic messaging and other personal information manager (PIM) application functions. Handheld communication devices include mobile stations such as simple cellular telephones, smart telephones, wireless PDAs, wired PDAs, and reduced-sized laptop computers. Due to the flexibility of handheld communication devices, users are becoming more dependent on handheld communication devices and use these devices beyond working hours and in poor lighting conditions. In addition, some users prefer metallic components or metal-like components on the handheld communication devices. In some cases, users will purchase a handheld communication device with a metallic look instead of a similar device without the metallic look.

BRIEF DESCRIPTION OF THE DRAWINGS

Embodiments of the present application will now be described, by way of example only, with reference to the attached Figures, wherein:

FIG. 3C is a top view of a navigation module without a navigation pad and with a chrome-like ring surrounded by an illumination ring in accordance with an exemplary embodiment;

FIG. 4C is a top view of a navigation module without a navigation pad and with an illumination ring surrounded by a chrome-like ring in accordance with an exemplary embodiment;

DETAILED DESCRIPTION

Figure 1A:
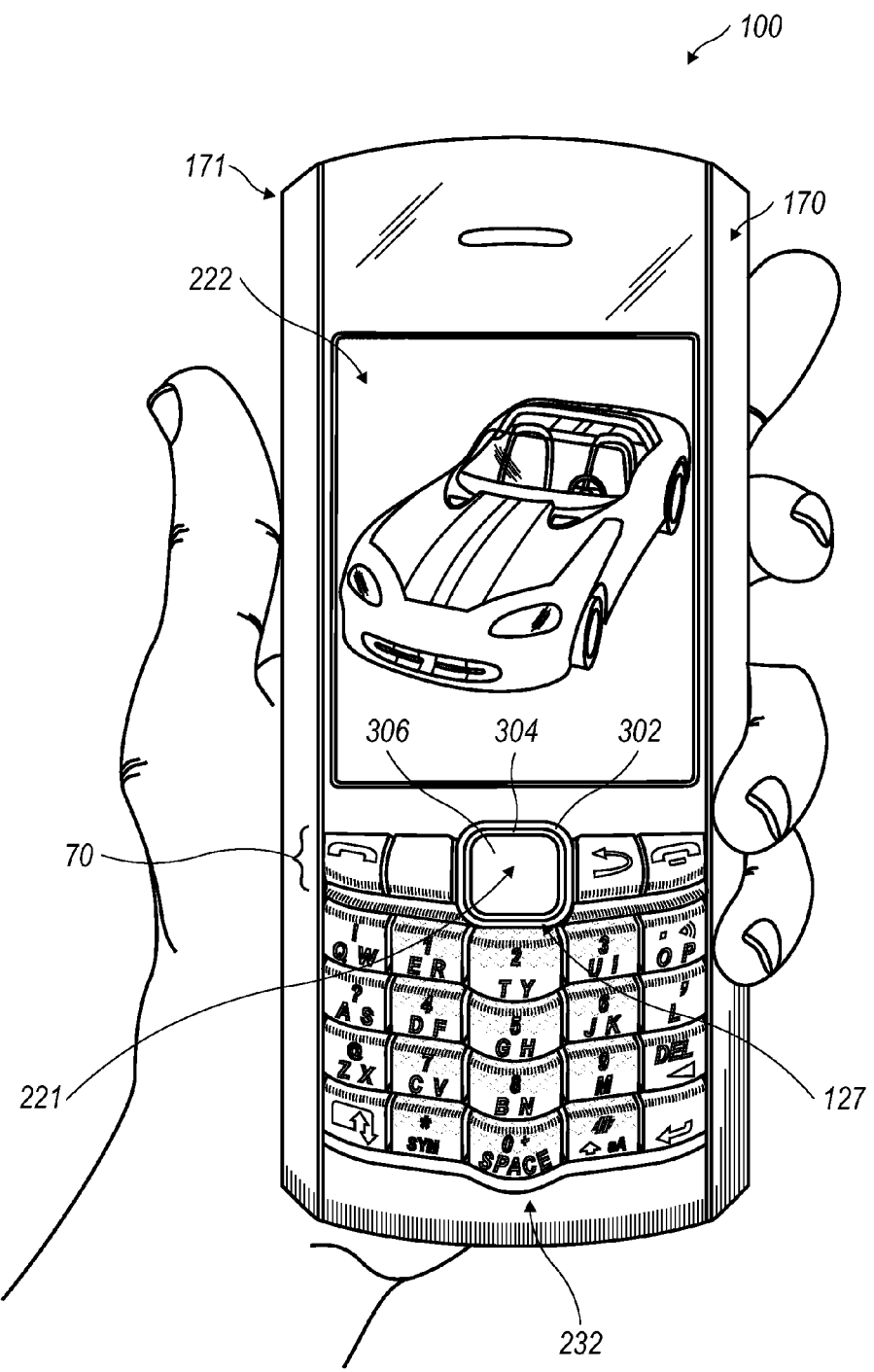
FIG. 1A is a front view of a handheld communication device having a reduced QWERTY keyboard in accordance with an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

In general, described herein is a navigation module or device. The navigation module can be used as part of a user input or user interface device. The navigation module can further be implemented in a portable electronic device, such as a smart phone, personal digital assistant (PDA), laptop computers, tablet computer, remote control, game controller, Global Positioning System (GPS) device. The navigation module can also be implemented in an electronic device that is not as readily portable, such as a desktop computer, copy machine, desktop telephone, etc. For simplicity, the navigation module will be described in the context of a portable, handheld communication device. Generally speaking, the navigation module is an input device 221 by which a user can point, select, direct a cursor, scroll, pan, hover a cursor over, drag, drop, aim, gesture, or otherwise supply input by controlling movement or operation of actual or virtual components (such as icons, menus, text, links, dialogs and the like) of the electronic device.

The navigation module includes a navigation pad, a metallic or metallic-like ring surrounding the navigation pad, an illumination ring surrounding the navigation pad, and a light source. The metallic or metallic-like ring can be any material that is solid metal, including chrome, stainless steel, brass, gold, aluminum, and the like. The metallic or metallic-like ring can also be made of any material that looks like metal, such as various kinds of plastics, ceramics and rubber. In addition, the metallic or metallic-like ring can include one or more materials that are metals, and one or more materials that look like metals. Since a typical ring can look like it is made of the reflective metal chrome, this ring can be referred to herein for simplicity and convenience as a "chrome-like ring." A chrome-like ring is "chrome-like" in the sense that has the shiny metallic appearance of chrome, although the chrome-like ring need not include any genuine chrome. The chrome-like ring can be constructed of genuine chrome, or be made from a metal that is plated or otherwise coated with chrome, or can include any other materials, and need not include any genuine chrome at all. The surface can be smooth or textured (e.g., bumped, ridged, brushed), for example, and can have a silver finish, gold finish, bronze finish, other metallic finish or any other finish.

The light source is optically coupled to at least the illumination ring. In general, two elements are optically coupled when light from one is directed to the other. Optically coupled elements can be, but need not be, mechanically or electrically connected to one another. The illumination ring can be interposed between the chrome-like ring and the navigation pad. With this apparatus, a portion of the navigation module can be illuminated, which can make it easier for a user to use the navigation module in a poorly illuminated environment.

Figure 1B:
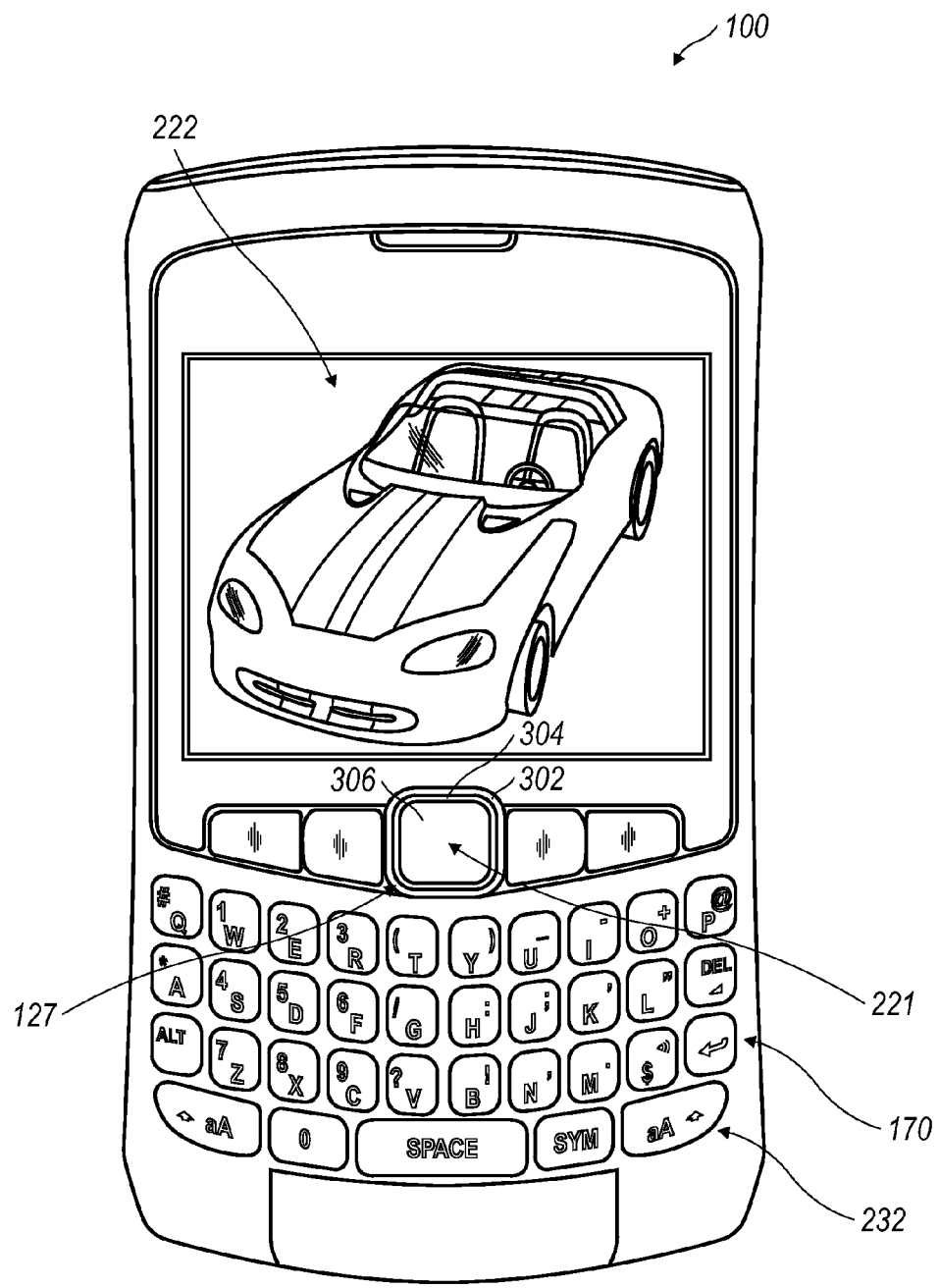
FIG. 1B is a front view of a handheld communication device having a full QWERTY keyboard in accordance with an exemplary embodiment.

Referring to FIGS. 1A and 1B, front views of handheld or electronic communication devices 100 having a reduced QWERTY keyboard and a full QWERTY keyboard 232, respectively. Each key of the keyboard 232 can be associated with at least one indicia representing an alphabetic character, a numeral, or a command (such as a space command, return command, or the like). The plurality of the keys having alphabetic characters are arranged in a standard keyboard layout. This standard keyboard layout can be a QWERTY layout (shown in FIGS. 1A and 1B), a QZERTY layout, a QWERTZ layout, an AZERTY layout, a Dvorak layout, a Russian keyboard layout, a Chinese keyboard layout, or other similar layout. These standard layouts are provided by way of example and other similar standard layouts are considered within the scope of this disclosure. The keyboard layout can be based on the geographical region in which the handheld device is intended for sale. In some examples, the keyboard can be interchangeable such that the user can switch between layouts. In other examples, the keyboard is a virtual keyboard provided on a touch screen display (not shown).

Figure 2:
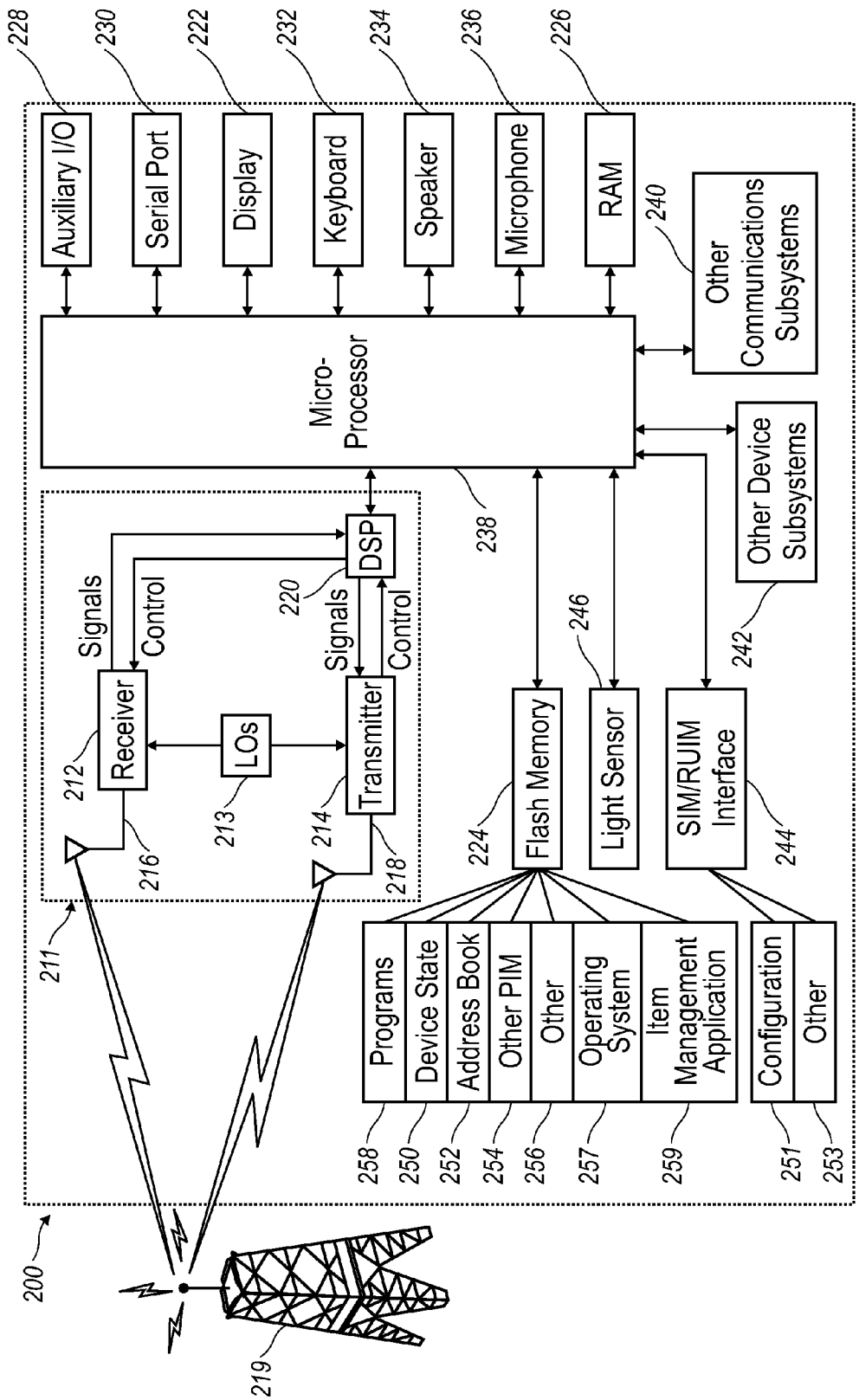
FIG. 2 is a block diagram representing a handheld communication device interacting in a communication network in accordance with an exemplary embodiment.

As shown, the exemplary communication devices 100 are communicatively coupled to a wireless network 219 as exemplified in the block diagram of FIG. 2. The communication can be one-way or two-way. These figures are exemplary only, and those persons skilled in the art will appreciate that additional elements and modifications can be necessary to make the communication device 100 work in particular network environments. While in the illustrated embodiments, the communication devices 100 are smart phones, however, in other embodiments, the communication devices 100 can be personal digital assistants (PDA), laptop computers, desktop computers, servers, or other communication device capable of sending and receiving electronic messages.

Referring to FIG. 2, a block diagram of a communication device in accordance with an exemplary embodiment is illustrated. As shown, the communication device 100 includes a microprocessor 238 that controls the operation of the communication device 100. A communication subsystem 211 performs all communication transmission and reception with the wireless network 219. The microprocessor 238 further can be communicatively coupled with an auxiliary input/output (I/O) subsystem 228 which can be communicatively coupled to the communication device 100. Additionally, in at least one embodiment, the microprocessor 238 can be communicatively coupled to a serial port (for example, a Universal Serial Bus port) 230 which can allow for communication with other devices or systems via the serial port 230. A display 222 can be communicatively coupled to microprocessor 238 to allow for displaying of information to an operator of the communication device 100. When the communication device 100 is equipped with the keyboard 232, the keyboard can also be communicatively coupled with the microprocessor 238. The communication device 100 can include a speaker 234, a microphone, 236, random access memory (RAM) 226, and flash memory 224, all of which can be communicatively coupled to the microprocessor 238. Other similar components can be provided on the communication device 100 as well and optionally communicatively coupled to the microprocessor 238. Other communication subsystems 240 and other communication device subsystems 242 are generally indicated as being functionally connected with the microprocessor 238 as well. An example of a communication subsystem 240 is that of a short range communication system such as BLUETOOTH® communication module or a WI-FI® communication module (a communication module in compliance with IEEE 802.11b) and associated circuits and components. Additionally, the microprocessor 238 is able to perform operating system functions and enables execution of programs on the communication device 100. In some embodiments not all of the above components can be included in the communication device 100. For example, in at least one embodiment the keyboard 232 is not provided as a separate component and is instead integrated with a touch-screen as described below.

The auxiliary I/O subsystem 228 can take the form of a variety of different navigation tools 127 (multi-directional or single-directional) such as an optical navigation module or tool or device 221 as illustrated in the exemplary embodiment shown in FIGS. 1A and 1B and shown in more detail in FIGS. 3A-C, 4A-C, and 5A-C. In other embodiments, a trackball, thumbwheel, a navigation pad, a joystick, touch-sensitive interface, or other I/O interface can be used. The navigation tool 127 can be located on a front surface 170 of the communication device 100 or can be located on any exterior surface of the communication device 100. Other auxiliary I/O subsystems can include external display devices and externally connected keyboards (not shown). While the above examples have been provided in relation to the auxiliary I/O subsystem 228, other subsystems capable of providing input or receiving output from the communication device 100 are considered within the scope of this disclosure. Additionally, other keys can be placed along the side of the communication device 100 to function as escape keys, volume control keys, scrolling keys, power switches, or user programmable keys, and can likewise be programmed accordingly.

As can be appreciated from FIGS. 1A and 1B, the communication device 100 comprises the lighted display 222 located above the keyboard 232 constituting a user input and suitable for accommodating textual input to the communication device 100. The front face 170 of the communication device 100 has a navigation row 70. As shown, the communication device 100 is of unibody construction, also known as a "candy-bar" design. In alternate embodiments, the communication device 100 can be a "clamshell" or a "slider" or other non-unitary-body design.

As described above, the communication device 100 can include the auxiliary input 228 that acts as a cursor navigation tool 127 and which can be also exteriorly located upon the front face 170 of the communication device 100. Its front face location allows the tool to be easily actuated by a thumb or a finger, like the keys of the keyboard 232. An embodiment provides the navigation tool 127 in the form of a navigation module 221 having an optical sensor or laser sensor, a capacitive sensor, or both, which can be utilized to instruct two-dimensional or three-dimensional screen cursor movement in substantially any direction, as well as act as an actuator when the optical navigation module 221 is depressed like a button. The placement of the navigation tool 127 can be above the keyboard 232 and below the display screen 222; here, it can avoid interference during keyboarding and does not block the operator's view of the display screen 222 during use, e.g., as shown in FIGS. 1A and 1B.

As illustrated in FIGS. 1A and 1B, the communication device 100 can be configured or capable of sending and receiving messages. In one or more embodiments, the communication device 100 can only send messages or can only receive messages. In one or more embodiments, the communication device 100 can send and receive messages. The communication device 100 includes a body 171 which can, in some embodiments, be configured to be held in one hand by an operator of the communication device 100 during text entry. The display 222 is included which is located on the front face 170 of the body 171 and upon which information is displayed to the operator during text entry. The communication device 100 can also be configured to send and receive voice communications such as mobile telephone calls. The communication device 100 can also include a camera (not shown) to allow the user to take electronic photographs which can be referred to as photos or pictures.

Furthermore, the communication device 100 is equipped with components to enable operation of various programs, as shown in FIG. 2. In an exemplary embodiment, the flash memory 224 is enabled to provide a storage location for the operating system 257, device programs 258, and data. The operating system 257 is generally configured to manage other programs 258 that are also stored in memory 224 and executable on the microprocessor 238. The operating system 257 honors requests for services made by programs 258 through predefined program 258 interfaces. More specifically, the operating system 257 typically determines the order in which multiple programs 258 are executed on the microprocessor 238 and the execution time allotted for each program 258, manages the sharing of memory 224 among multiple programs 258, handles input and output to and from other device subsystems 242, and so on. In addition, operators can typically interact directly with the operating system 257 through a user interface usually including the keyboard 232 and display screen 222. While in an exemplary embodiment the operating system 257 is stored in flash memory 224, the operating system 257 in other embodiments is stored in read-only memory (ROM) or similar storage element (not shown). As those skilled in the art will appreciate, the operating system 257, device program 258 or parts thereof can be loaded in RAM 226 or other volatile memory.

When the communication device 100 is enabled for two-way communication within the wireless communication network 219, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 100 can require a unique identifier to enable the communication device 100 to transmit and receive signals from the communication network 219. Other systems cannot require such identifying information. GPRS, UMTS, and EDGE use a smart card such as a Subscriber Identity Module (SIM) in order to allow communication with the communication network 219. Likewise, most CDMA systems use a Removable Identity Module (RUIM) in order to communicate with the CDMA network. A smart card can be used in multiple different communication devices 100. The communication device 100 can be able to operate some features without a smart card, but it will not be able to communicate with the network 219. A smart card interface 244 located within the communication device 100 allows for removal or insertion of a smart card (not shown). The smart card features memory and holds key configurations 251, and other information 253 such as identification and subscriber related information. With a properly enabled communication device 100, two-way communication between the communication device 100 and communication network 219 is possible.

If the communication device 100 is enabled as described above or the communication network 219 does not require such enablement, the two-way communication enabled communication device 100 is able to both transmit and receive information from the communication network 219. The transfer of communication can be from the communication device 100 or to the communication device 100. In order to communicate with the communication network 219, the communication device 100 in the presently described exemplary embodiment is equipped with an integral or internal antenna 218 for transmitting signals to the communication network 219. Likewise the communication device 100 in the presently described exemplary embodiment is equipped with another antenna 216 for receiving communication from the communication network 219. These antennae (216, 218) in another exemplary embodiment are combined into a single antenna (not shown). As one skilled in the art would appreciate, the antenna or antennae (216, 218) in another embodiment are externally mounted on the communication device 100.

When equipped for two-way communication, the communication device 100 features the communication subsystem 211. As is understood in the art, this communication subsystem 211 is modified so that it can support the operational needs of the communication device 100. The subsystem 211 includes a transmitter 214 and receiver 212 including the associated antenna or antennae (216, 218) as described above, local oscillators (LOs) 213, and a processing module 220, which in the presently described exemplary embodiment is a digital signal processor (DSP) 220.

It is contemplated that communication by the communication device 100 with the wireless network 219 can be any type of communication that both the wireless network 219 and communication device 100 are enabled to transmit, receive and process. In general, these can be classified as voice and data. Voice communication generally refers to communication in which signals for audible sounds are transmitted by the communication device 100 through the communication network 219. Data generally refers to all other types of communication that the communication device 100 is capable of performing within the constraints of the wireless network 219.

The keyboard 232 can include a plurality of keys that can be of a physical nature such as actuable buttons, or they can be of a software nature, typically constituted by virtual representations of physical keys on the display screen 222 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space.

In the case of virtual keys, the indicia for the respective keys are shown on the display screen 222, which in one embodiment is enabled by touching the display screen 222, for example, with a stylus, finger, or other pointer, to generate the character or activate the indicated command or function. Some examples of display screens 222 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular program or feature of the communication device 100 is shown on the display screen 222 in the same configuration as the physical keys. Using this configuration, the operator can select the appropriate physical key corresponding to what is shown on the display screen 222. Thus, the desired character, command or function is obtained by depressing the physical key corresponding to the character, command or function displayed at a corresponding position on the display screen 222, rather than touching the display screen 222.

While the above description generally describes the systems and components associated with a handheld communication device, the communication device 100 could be another communication device such as a PDA, a laptop computer, desktop computer, a server, or other communication device. In those embodiments, different components of the above system might be omitted in order to provide the desired communication device 100. Additionally, other components not described above can be required to allow the communication device 100 to function in a desired fashion. The above description provides only general components and additional components can be required to enable the system to function. These systems and components would be appreciated by those of ordinary skill in the art.

Figure 3A:
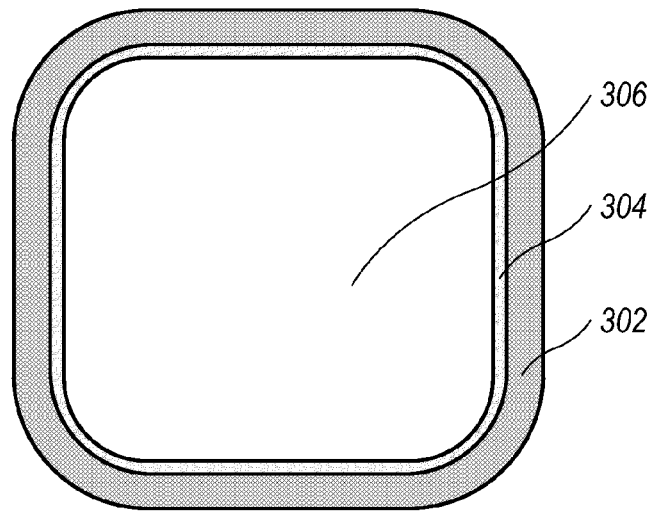
FIG. 3A is a top view of a navigation module with a chrome-like ring interposed between a navigation pad and an illumination ring in accordance with an exemplary embodiment.
Figure 4A:
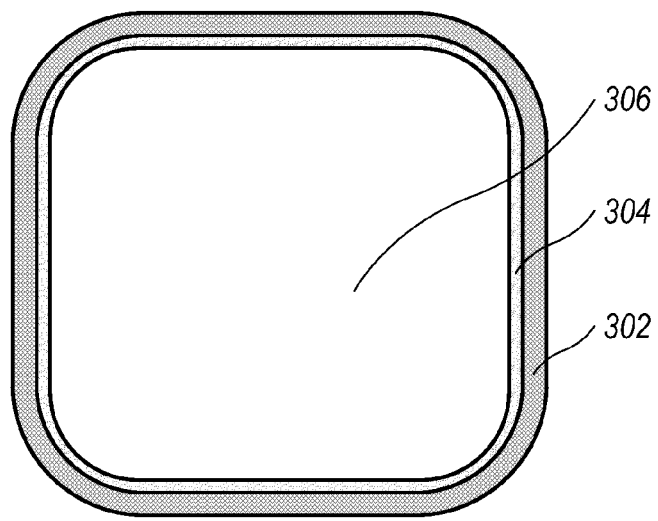
FIG. 4A is a top view of a navigation module with an illumination ring interposed between a navigation pad and a chrome-like ring in accordance with an exemplary embodiment.
Figure 5A:
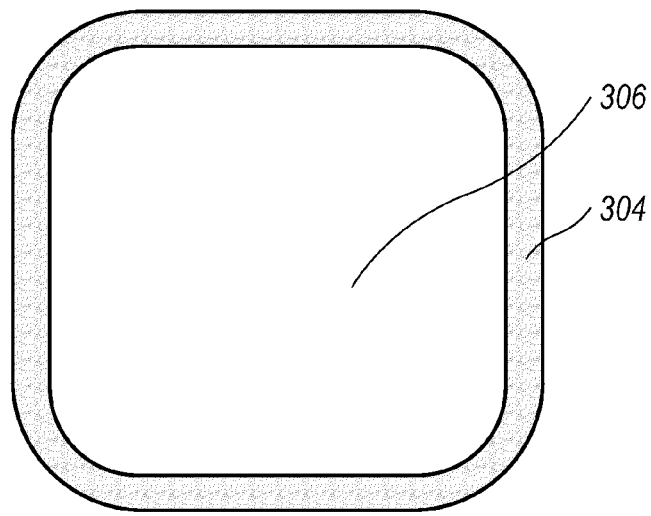
FIG. 5A is a top view of a navigation module with a single chrome-like ring surrounding a navigation pad in accordance with an exemplary embodiment.

Referring to FIGS. 3A, 4A, and 5A, top views of the navigation module 221 in accordance with exemplary embodiments are illustrated. As shown in FIG. 3A, the navigation module 221 can have a ring 304 interposed between an illumination ring 302 and a navigation pad 306. As previously discussed, ring 304 can be referred to as a "chrome-like" ring 304, in that it can have various cosmetic qualities (such as a reflective or shiny surface, or the simulation of a shiny surface) associated with chrome. Ring 304 can also have one or more physical qualities associated with chrome (such as resistance to corrosion, hardness, robustness, rigidity or resistance to denting) that can be associated with chrome. Ring 304 can also have one or more qualities that are not ordinarily associated with chrome, such as being made of a non-conductive material or materials (construction from such materials can assist in reducing electric static discharge (ESD)). One potential advantage of the ring 304 being chrome-like is that it can be distinct in appearance from proximate structures, and its cosmetic qualities can be enhanced by illumination. Further, chrome-like ring 304 can have, but need not have, a unitary structure. In other words, in some embodiments, ring 304 can be an actual one-piece ring, and in other embodiments, ring 304 can be composed of one or more separate structures or segments, which can give the appearance of being ring-like.

The illumination ring 302 surrounds the chrome-like ring 304 which surrounds the navigation pad 306. In general, the navigation pad 306 represents the surface with which the user interacts (e.g., by pointing, pressing, tapping or sliding) to perform navigation. As will be discussed below, one or more sensors can detect this interaction. As shown in FIG. 4A, the navigation module 221 can have an illumination ring 302 interposed between a chrome-like ring 304 and the navigation pad 306. The chrome-like ring 304 surrounds the illumination ring 302 which surrounds the navigation pad 306. As shown in FIG. 5A, the optical navigation module 221 can have a chrome-like ring 304 which surrounds the navigation pad 306. As shown in FIGS. 3A, 4A, and 5A, the illumination ring 302, chrome-like ring 304, and navigation pad 306 can be substantially square with rounded corners. In one or more other embodiments, the illumination ring 302, chrome-like ring 304 or both rings 302, 304 can be different shapes (e.g. rectangular, rectangular with rounded corners, elliptical, etc).

The illumination ring 302 can be made of a translucent material or materials (such as, but not limited to plastic) which can allow light to pass through the illumination ring 302. The chrome-like ring 304 can be made using an opaque material or materials which can reduce or prevent light from passing through or the ring 304 can be made using a translucent material or materials which can allow light to pass through. The illumination ring 302 can be made of a non-conductive material or materials that can assist in reducing ESD.

The illumination ring 302, chrome-like ring 304, or both rings 302, 304 can be made of non-conductive vacuum metallization (NCVM). In at least one embodiment, other methods or materials can be used to create the illumination ring 302, chrome-like ring 304, or both rings 302, 304. NCVM can assist in reducing ESD. NCVM is manufactured by at least Dynatec Corporation of Richmond Hill, Ontario. NCVM can provide a metal film or thin metal film over a resin surface. The metal film can provide a metal-like look (e.g., texture, finish or both). The metal-like look can provide a chrome-like look. A handheld communication device 100 having a metal-like look is desirable by some users. The thin metal film can be coated with an ultra violet (UV) coating to provide a surface hardness and adhesion comparable to plating.

The NCVM can be done using two different processes: general disposition and discontinuous deposition. Using the general deposition process, metal can be splattered onto the resin surface using vaporized metal (such as, but not limited to, tin) rods to provide metal deposits which can allow light to pass through small gaps in the metal deposits. The discontinuous deposition process provides a thicker, more consistent metal layer which can reduce or prevent light from passing through the metal deposits. The discontinuous deposition process can prevent radio inference and does not require any measures against electrostatic. Using NCVM for the illumination ring 302, chrome-like ring 304, or both rings 302, 304, can allow light to pass through one or both rings 302, 304. Thus, the chrome-like ring 304 can reduce or prevent light from passing through in one or more embodiments or can allow light to pass through in one or more embodiments. For embodiments in which the chrome-like ring 304 allows light to pass through, the light can pass through the chrome-like ring 304 from the bottom out, e.g., when the chrome-like ring 304 is backlit. Allowing light to pass through one or both rings 302, 304 can provide illumination to the navigation pad 306 which can assist a user using the handheld electronic device 100 in poor lighting conditions.

In at least one embodiment, the illumination ring 302 and chrome-like ring 304 can be one ring, e.g., a chrome-like ring 304 that can be illuminated, with approximately the same amount of metal deposition throughout (e.g., as shown in FIG. 5A) or with different amounts of metal deposition (as shown in FIGS. 3A and 4A) with one of the rings, e.g., the illumination ring 302, having one amount of metal deposition and the other ring, e.g., the chrome-like ring 304, having a different amount of metal deposition. In other embodiments, the illumination ring 302 and chrome-like ring 304 can be made using non-NCVM materials. For example, the illumination ring 302 can be made using a translucent material and the chrome-like ring 304 can be made using an opaque material.

Figure 3B:
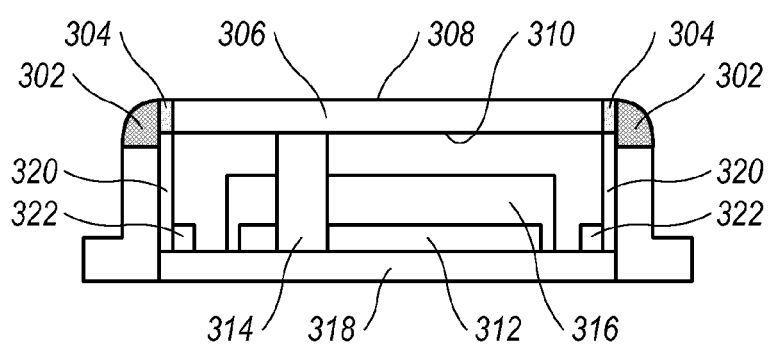
FIG. 3B is a cross sectional view of a navigation module with a chrome-like ring interposed between a navigation pad and an illumination ring in accordance with an exemplary embodiment.
Figure 4B:
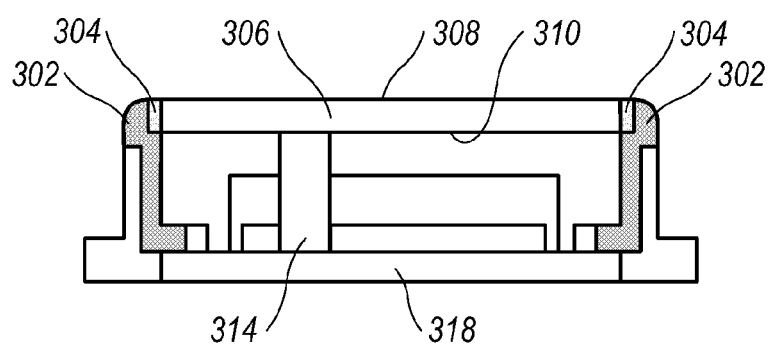
FIG. 4B is a cross sectional view of a navigation module with an illumination ring interposed between a navigation pad and a chrome-like ring in accordance with an exemplary embodiment.
Figure 5B:
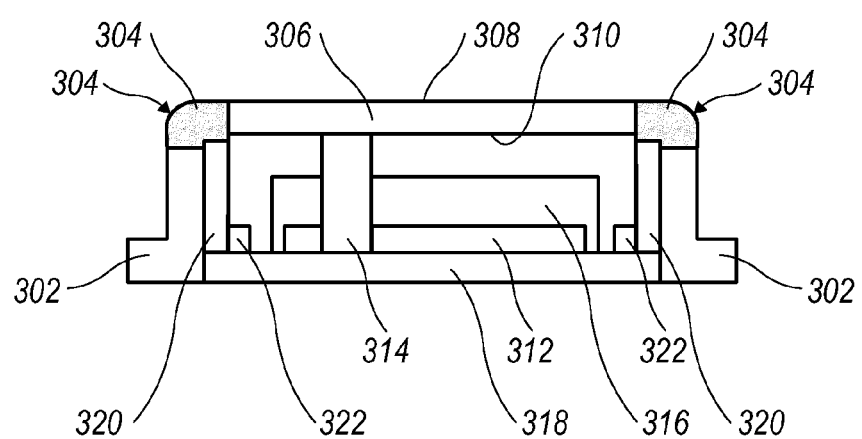
FIG. 5B is a cross sectional view of a navigation module with a single chrome-like ring surrounding a navigation pad in accordance with an exemplary embodiment.

Referring to FIGS. 3B, 4B, and 5B, cross sectional views of the navigation module 221 in accordance with exemplary embodiments are shown. Specifically, FIG. 3B is a cross sectional view of the navigation module 221 with the chrome-like ring 304 interposed between the illumination ring 302 and the navigation pad 306. FIG. 4B is a cross sectional view of another embodiment of the optical navigation module 221 with the illumination ring 302 interposed between the chrome-like ring 304 and the navigation pad 306. FIG. 5B is a cross section view of yet another embodiment of the optical navigation module 221 with the chrome-like ring 304 surrounding the navigation pad 306. As shown in FIGS. 3B, 4B, and 5B, the optical navigation module 221 can include the navigation pad 306 having a top (or first) surface 308 and a bottom (or second) surface 310.

Figure 5C:
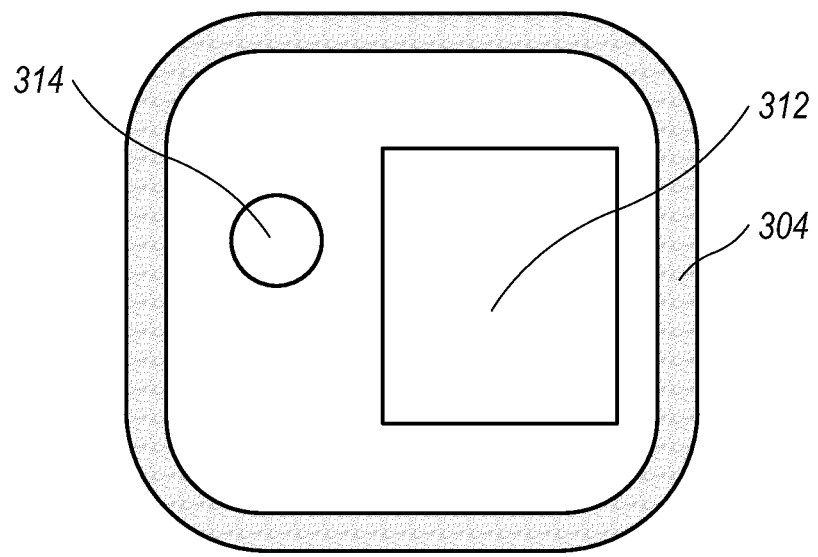
FIG. 5C is a top view of a navigation module without a navigation pad and with a single chrome-like ring in accordance with an exemplary embodiment.

The navigation module 221 can include an optical or laser sensor 312, a capacitive sensor 314, or both. The optical or laser sensor 312 and capacitive sensor 314 can be positioned below the bottom surface 310 of the navigation pad 306 (such that the sensors 312, 314 can be concealed from a user by the navigation pad 306). The optical or laser sensor 312 can be configured to detect movement of an object in the X axis, Y axis or both when the object is in contact with the top surface 308 of the navigation pad 306. In other words, if the top surface 308 of the navigation pad 306 is substantially in the X-Y plane (with the Z axis being orthogonal to the X-Y plane), one or more sensors 312 can detect the position and/or change in position along the X axis and/or Y axis (that is, in the X and/or Y directions) of an object such as a finger, thumb, stylus or any other object physically touching or applying pressure against the navigation pad 306. A lens (or aperture) 316 can be proximate to or physically coupled to the optical or laser sensor 312. The lens 316—which in some embodiments can be affect light optically such as by refraction, focusing, or magnification—can improve the field of view of the optical sensor or laser sensor 312. The lens 316 can be matched to the navigation pad 306 to improve the field of view for the optical or laser sensor 312 to include the entire top surface 308 of the navigation pad 306, e.g., to detect an object (not shown) in contact with a part of the top surface 308 of the navigation pad 306. In one or more embodiments, the lens 316 can be an aperture lid. The aperture lid can be non-reflective and can block ambient light. The aperture lid can be made of black polycarbonate plastic or any other material capable of blocking ambient light. In other embodiments, other optical or laser sensors 312 and lenses 316 can be used. FIGS. 3C, 4C, and 5C show top views of the optical navigation module 221, without the navigation pad 306, in order to show relative positioning of the optical or laser sensor 312 and capacitive sensor 314 in these exemplary embodiments. In one or more embodiments, the optical or laser sensor 312 and capacitive sensor 314 can be positioned differently.

The capacitive sensor 314 can be configured to detect movement of an object (not shown) above the top surface 308 of the navigation pad 306 in the Z axis when the object is within a given or set range of the top surface 308 (which can be, but in some circumstances need not be, in contact with top surface 308) of the navigation pad 306. The capacitive sensor 314 can use a magnetic field to detect an object above the top surface 308 of the navigation pad 306. In at least one embodiment, the capacitive sensor 314 can be a single electrode connected to a capacitive sensor. The given or set range is dependent on the capacitive sensor. In one exemplary embodiment, the range is less than five millimeters (5 mm) in the Z axis (that is, the object detected is in the range of about 5 mm or less above the top surface 308). In at least one embodiment, the capacitive sensor can detect movement in the X axis and Y axis. The optical or laser sensor 312 and capacitive sensor 314 can be communicatively coupled to a printed circuit board (PCB) 318. In at least one embodiment, the PCB 318 is part of the navigation tool 127. The PCB 318 can be sized to fit within the navigation tool 127. The PCB 318 can be communicatively coupled to the microprocessor 238.

In at least one embodiment, the optical sensor 312 can be an ADNS-5700 optical sensor and a lens 316 can be an ADNS-5100 round lens, ADNS-5100-001 trim lens, or the ADNS-5100-002 truncated round lens by Avago Technology of San Jose, Calif. In at least one embodiment, the laser sensor 312 can be a CYONSFN2051-LBXC laser sensor by Cypress Semiconductor Corporation of San Jose, Calif. In at least one embodiment, the capacitive sensor 314 can be a single electrode connected to a capacitive sensor. In at least one embodiment, the capacitive sensor 314 can be an AD7147 IC by Analog Devices of Norwood, Mass. In other embodiments, other optical sensors 312, laser sensors 312, or other capacitive sensors 314 can be used. Each sensor 312, 314 can include a microprocessor (not shown), e.g., a microprocessor associated with the optical or laser sensor 312, or capacitive sensor 314. The microprocessor associated with the optical or laser sensor 312 or capacitive sensor 314 can be communicatively coupled to or on the PCB 318.

To illuminate the illumination ring 302, chrome-like ring 304, or both rings 302, 304, one or more rings 302, 304 can be optically coupled to at least one light source 322. The light source 322 can be a light emitting diode (LED), including but not limited to a white LED, a colored LED, a multi-colored LED, or any other suitable lighting source that can produce light. When the light source 322 is lit, the light can travel through the illumination ring 302 to provide illumination to the navigation pad 306. If the chrome-like ring 304 is translucent, the light can travel through the chrome-like ring 304 to assist in illuminating the navigation pad 306. In at least one embodiment, one or more light pipes 320 can be optically coupled to the at least one light source 322 and to the illumination ring 302, chrome-like ring 304, or both rings 302, 304. In some embodiments, the light pipes 320 guide light originating from the light source 322 to at least a portion of the navigation pad 306 to illuminate the portion of the navigation pad. In at least one embodiment, the one or more light pipes 320 can be part of the illumination ring 302 or chrome-like ring 304 (not shown). As shown in FIGS. 3B and 4B, at least two light pipes 320 can be optically coupled to a corresponding light source 322 at one end of the light pipe 320 and to the illumination ring 302 at the other end of the light pipe 320. As shown in FIG. 5B, at least two light pipes 320 can be optically coupled to a corresponding light source 322 at one end and to the chrome-like ring 304 at the other end of the light pipe 320.

Each light source 322 can be communicatively coupled to the microprocessor 238, to the microprocessor associated with the one or more sensors 312, 314, or to both. The microprocessor 238, the microprocessor associated with the one or more sensors 312, 314, or both can control the one or more light sources 322. The handheld communication device 100 can include a light sensor (not shown) coupled to the microprocessor 238 to determine when to activate (e.g., turn on) the one or more lighting sources 322. For example, if the light sensor determines that there is a low light level (e.g., the light level is below a predetermined value), the microprocessor 238, the microprocessor associated with the one or more sensors 312, 314, or both, can activate the one or more light sources 322 to provide illumination. The microprocessor 238, the microprocessor associated with the one or more sensors 312, 314, or both, can be coupled with an illumination feature for the keyboard 232, which can illuminate when the one or more light sources 322 illuminate the navigation tool 221.

The optical or laser sensor 312, the capacitor sensor 314, or both can cause the handheld electronic device 100 to exit from a sleep mode. Sleep mode can be a low power mode in which the display 222 dims and non-essential functions are inactivated. For example, if the device is in sleep mode, if the user places his finger on or near the navigation tool 221, the optical or laser sensor 312, the capacitor sensor 314, or both, can detect the finger of the user and can cause the handheld electronic device 100 to exit the sleep mode and become fully operational. When the finger of the user moves away from the navigational tool 221, e.g., out of the range of the optical or laser sensor 312, the capacitor sensor 314, or both, the handheld electronic device 100 can return to the sleep mode or wait a predetermined period of time and then return to the sleep mode if the finger of the user is not detected.

In one or more embodiments, a navigation module 221 for a handheld electronic device 100 can include a navigation pad 306 surrounded by an illumination ring 302 and a chrome-like ring 304. The illumination ring 302 can be interposed between the navigation pad 306 and the chrome-like ring 304 or the chrome-like ring 304 can be interposed between the navigation pad 306 and the illumination ring 302. The illumination ring 302, which surrounds the navigation pad 306, can illuminate thus providing guidance to the location of the navigation pad 306. The illumination ring 302 can also provide sufficient light to allow a user to see the navigation pad 306. The illumination ring 302 and chrome-like ring 304 can be one ring or two rings. In one embodiment, the illumination ring 302 and chrome-like ring 304 can be one ring with an illumination part and a chrome-like part. The chrome-like ring 304 can also provide illumination when the chrome-like ring 304 is made of a translucent material (or includes openings or translucent or transparent portions to enable passage of light) and is coupled to a light source 322. Thus, the chrome-like ring 304 can have a chrome appearance when it is not illuminated, e.g., when light is not needed, and can provide illumination when light is need. The chrome-like ring 304 can provide a chrome look. In one or more embodiments, the chrome-like ring 304 can have another metal looking finish. The chrome-like ring 304 can provide a chrome-like finish which can cause a person to buy the handheld communication device 100 over another handheld communication device 100 which does not have the chrome like finish due to the chrome-like finish.

In some example embodiments, the illumination ring 302 may not entirely surround the navigation pad 306. The illumination ring 302 can surround only a portion of the navigation pad 306 (e.g., resembling a "C" rather than an "O," or resembling one or more segments arrayed around the periphery of the navigation pad; in general, illumination ring 302 can "surround" at least a portion of the navigation pad 306 if one or more segments are arrayed around more than fifty percent of the perimeter of the navigation pad 306). Similarly, in some example embodiments, the chrome-like ring 304 may not entirely surround the navigation pad 306. The chrome-like ring 304 can surround only a portion of the navigation pad 306.

Implementation of one or more embodiments can realize one or more advantages, some of which have been mentioned already. Some embodiments are versatile and can be implemented in a variety of devices, in a variety of sizes, in a variety of shapes, and in a in a variety of configurations. That various embodiments can be compact and can be beneficial for handheld portable electronic devices, in which considerations of size and weight may take on importance. Various embodiments can supply aesthetic qualities, such as by adding distinctiveness and attractiveness to a device, along with functional qualities, such as by adding good visibility and visual feedback for use under some conditions of ambient lighting. In a dimly lit environment, for example the illumination can aid a user in finding and activating the navigation device. Some embodiments, by having distinctive hardness or texture or finish, for example, can also aid a user by offering tactile feedback.

Further, some embodiments can support deployment of more than one navigation modules. Each module can receive illumination from its own light source, or multiple modules can receive illumination from a single light source (e.g., via branching light pipes). In addition, the concepts described herein can be applied to some types of navigation modules that use sensors other than or in addition to those specifically mentioned herein, especially in embodiments in which it illumination and a reflective structure can be useful in a poorly illuminated environment.

Exemplary embodiments have been described hereinabove regarding the implementation of an illumination feature for a navigation tool for handheld communication devices. As indicated above, although the exemplary embodiments have been described as having a chrome-like ring 304, other metal and metal-like rings (such as plastic rings that may or may not resemble metal rings) can be used. For example, a silver-like ring or gold-like ring can be used to provide a metal-like look, e.g., texture, finish or both. Many of these embodiments offer a gleam in the presence of illumination, which can aid in the navigation module being more easily perceived in a poorly lit environment. Various modifications to and departures from the disclosed embodiments will occur to those having skill in the art. The subject matter that is intended to be within the spirit of this disclosure is set forth in the following claims.

The invention claimed is:

1. A communication device comprising:
 an optical navigation module configured to generate a navigation signal, the optical navigation module comprising:
  a navigation pad having a top surface and a bottom surface;
  a metallic ring surrounding at least a portion of the navigation pad and having at least an exposed top surface;
  an illumination ring surrounding the metallic ring, the illumination ring being the same ring as the metallic ring and having at least an exposed top surface;
  a light source that emits light, the light source being optically coupled to the illumination ring and being optically decoupled from the navigation pad;
  a light sensor communicatively coupled to the light source, the light sensor configured to generate at least one first signal indicating a sufficient ambient light condition and at least one second signal indicating an insufficient ambient light condition, with the light source emitting light in response to an indication of an insufficient ambient light condition and the light source not emitting light in response to an indication of a sufficient ambient light condition;

a capacitive sensor positioned below the bottom surface of the navigation pad, the capacitive sensor being configured to detect movement of an object above the top surface of the navigation pad in the Z axis in the event the object is within a set range of the top surface of the navigation pad; and a laser sensor positioned below the bottom surface of the navigation pad, the laser sensor being configured to detect movement of the object in at least one of X axis and Y axis in the event the object is in contact with the top surface of the navigation pad.

2. The communication device of claim 1, wherein the light source is a light emitting diode.

3. The communication device of claim 1, wherein the light source is a multi-colored light emitting diode.

4. The communication device of claim 1, wherein at least one of the metallic ring and the illumination ring is formed using non-conductive vacuum metallization.

5. The communication device of claim 1, further comprising a lens positioned between the bottom surface of the navigation pad and the laser sensor.

6. The communication device of claim 1, further comprising a microprocessor communicatively coupled with the laser sensor, the capacitive sensor, and the light source, the microprocessor being configured to cause the light source to illuminate in response to at least one of the laser sensor and capacitive sensor detecting movement of the object.

7. The communication device of claim 6, wherein the microprocessor is further configured to exit from a sleep mode in response to at least one of the laser sensor and capacitive sensor detecting movement of the object.

8. The communication device of claim 1, further comprising at least one light pipe interposed between the light source and the illumination ring.

9. The communication device of claim 1, wherein the illumination ring, metallic ring, and navigation pad are substantially square.

10. The communication device of claim 1, wherein the illumination ring, metallic ring, and navigation pad are substantially square with rounded corners.

11. A communication device comprising:
a display;
a navigation tool module comprising:
  a navigation pad having a top surface and a bottom surface;
  a metallic ring surrounding at least a portion of the navigation pad and having at least an exposed top surface;
  an illumination ring surrounding the metallic ring, the illumination ring being the same ring as the metallic ring and having at least an exposed top surface;
  a light source that emits light, the light source being optically coupled to the illumination ring and being optically decoupled from the navigation pad;
  a light sensor communicatively coupled to the light source, the light sensor configured to generate at least one first signal indicating a sufficient ambient light condition and at least one second signal indicating an insufficient ambient light condition, with the light source emitting light in response to an indication of an insufficient ambient light condition and the light source not emitting light in response to an indication of a sufficient ambient light condition;
  a capacitive sensor positioned below the bottom surface of the navigation pad, the capacitive sensor being configured to detect movement of an object above the top surface of the navigation pad in the Z axis in the event the object is within the range of the top surface of the navigation pad; and
  a laser sensor positioned below the bottom surface of the navigation pad, the laser sensor configured to detect movement of the object in at least one of X axis and Y axis in the event the object is in contact with the top surface of the navigation pad; and
a microprocessor communicatively coupled to the display, the capacitive sensor, the laser sensor and the light sensor.

12. The communication device of claim 11, wherein the light source is a light emitting diode.

13. The communication device of claim 11, wherein at least one of the metallic ring and illumination ring is formed using non-conductive vacuum metallization.

14. The communication device of claim 11, further comprising a lens positioned between the bottom surface of the navigation pad and the laser sensor.

15. The communication device of claim 11, wherein the microprocessor is configured to cause the light source to illuminate in response to at least one of the laser sensor and capacitive sensor detecting movement of the object.

16. The communication device of claim 11, wherein the microprocessor is further configured to exit from a sleep mode in response to at least one of the laser sensor and capacitive sensor detecting movement of the object.

17. The communication device of claim 11, wherein the navigation tool further comprises at least one light pipe interposed between the light source and the illumination ring.

18. A communication device comprising:
an optical navigation module configured to generate a navigation signal, the optical navigation module comprising:
  a navigation pad having a top surface and a bottom surface;
  a metallic ring surrounding at least a portion of the navigation pad, the metallic ring comprising a non-translucent portion not adapted to illuminate and a translucent portion adapted to illuminate with the translucent portion surrounding the non-translucent portion;
  a light source that emits light, the light source being optically coupled to the metallic ring and being optically decoupled from the navigation pad;
  a light sensor communicatively coupled to the light source, the light sensor configured to generate at least one first signal indicating a sufficient ambient light condition and at least one second signal indicating an insufficient ambient light condition, with the light source emitting light in response to an indication of an insufficient ambient light condition and the light source not emitting light in response to an indication of a sufficient ambient light condition;
  a capacitive sensor positioned below the bottom surface of the navigation pad and configured to detect movement of an object above the top surface of the navigation pad in the Z axis in the event the object is within a set range of the top surface of the navigation pad;
  a lens; and
  a laser sensor positioned below the bottom surface of the navigation pad, the laser sensor being configured to detect movement of the object in at least one of X axis and Y axis in the event the object is in contact with the top surface of the navigation pad.

* * * * *

UNITED STATES PATENT AND TRADEMARK OFFICE
CERTIFICATE OF CORRECTION

| | |
|---|---|
| PATENT NO. | : 8,982,063 B2 |
| APPLICATION NO. | : 13/215814 |
| DATED | : March 17, 2015 |
| INVENTOR(S) | : Colin Shiva Ramrattan and Robert J. Lowles |

It is certified that error appears in the above-identified patent and that said Letters Patent is hereby corrected as shown below:

On the Title Page, item 54 Column 1 (Title), Line 1, Delete "NAVIAGATION" and insert -- NAVIGATION --, therefor.

In the specification

Column 1, Line 1, Delete "NAVIAGATION" and insert -- NAVIGATION --, therefor.

In the claims

Column 12, Line 50, In Claim 1, after "ring" insert -- including a non-illumination portion --.

Column 12, Line 53, In Claim 1, before "an" insert -- the metallic ring including --.

Column 12, Line 53, In Claim 1, after "illumination ring" insert -- portion --.

Column 12, Line 53, In Claim 1, delete "the metallic ring," and insert -- the non-illumination portion, --, therefor.

Column 12, Lines 54-55, In Claim 1, delete "being the same ring as the metallic ring and" and insert -- portion --, therefor.

Column 13, Line 46, In Claim 11, after "ring" insert -- including a non-illumination portion --.

Column 13, Line 49, In Claim 11, before "an" insert -- the metallic ring including --.

Column 13, Line 49, In Claim 11, after "illumination ring" insert -- portion --.

Column 13, Line 49, In Claim 11, delete "the metallic ring," and insert -- the non-illumination portion, --, therefor.

Column 13, Lines 50-51, In Claim 11, delete "being the same ring as the metallic ring and" and insert -- portion --, therefor.

Signed and Sealed this
Thirteenth Day of October, 2015

Michelle K. Lee
*Director of the United States Patent and Trademark Office*